Sept. 19, 1933.  S. J. WELCH  1,927,105
PIPE
Filed Oct. 8, 1932

Inventor
S. J. Welch

By Clarence A. O'Brien
Attorney

Patented Sept. 19, 1933

1,927,105

UNITED STATES PATENT OFFICE 1,927,105

PIPE

Solomon J. Welch, Pensacola, Fla.

Application October 8, 1932. Serial No. 636,894

2 Claims. (Cl. 137—75)

This invention relates to pipes, and has for one of its important objects to provide, in a manner as hereinafter set forth, a pipe embodying a novel construction, combination and arrangement through the medium of which the likelihood of the water or other liquid in the pipe freezing in cold weather will be materially reduced.

Another very important object of the invention is to provide a pipe of the aforementioned character embodying a construction which is such that bursting of said pipe in case of freezing of the water or other liquid therein will be prevented.

Another important object of the invention is to provide a novel construction of joint for connecting the pipe sections together.

Other objects of the invention are to provide a pipe of the character described which will be simple in construction, strong, durable, which will not rust inside, thereby assuring the delivery of clean water, and which may be manufactured at low cost.

All of the foregoing and still further objects and advantages of the invention will become apparent from a study of the following specification, taken in connection with the accompanying drawing, wherein like characters of reference designate corresponding parts thruout the several views, and wherein:—

Figure 1:
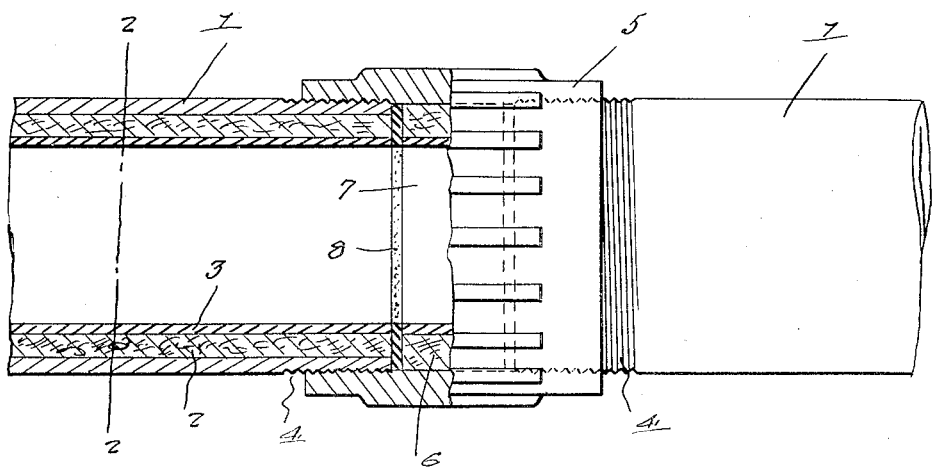
Figure 1 is a view partly in vertical longitudinal section and partially in side elevation of a pair of pipe sections and joint therefor constructed in accordance with the present invention.

Referring now to the drawing in detail, it will be seen that each section of pipe constructed in accordance with the present invention comprises a metallic tube 1 having a lining 2 of suitable yielding or compressible heat resisting material, preferably wool. Within the lining 2 is an expansible rubber sleeve 3 thru which the water passes.

The pipe sections are externally threaded, as at 4, on their end portions for receiving a ribbed coupling 5. A compressible washer or ring 6 is mounted in the coupling 5 between the adjacent ends of the pipe sections, said washer 6 having therein an expansible rubber sleeve 7 of an internal diameter equal to that of the sleeve 3. Then, a water-proof cement 8 is placed in the coupling 5 between the washer 6 and the pipe sections for sealing the ends of said pipe sections and preventing saturation of the lining 2 of each pipe section with water.

It will thus be seen that a pipe has been provided wherein by reason of the lining 2 of wool or other suitable compressible material, the chance of the water or other liquid in the pipe freezing is materially reduced. It will further be seen that if the water or other liquid in the pipe should freeze, consequent expansion will be permitted by the expansible sleeve 3 and the compressible lining 2 without bursting the tube 1.

Figure 2:
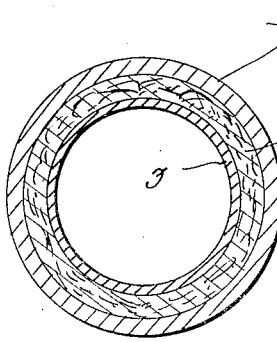
Fig. 2 is a view in vertical transverse section, taken substantially on the line 2—2 of Fig. 1.
Figure 3:
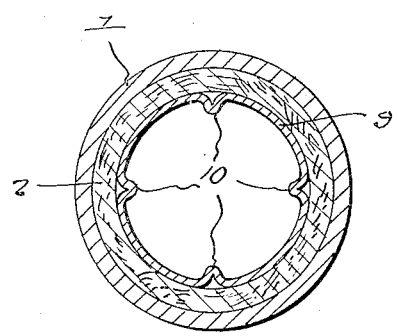
Fig. 3 is a view in vertical transverse section through a modified form of the pipe.

In the modified form of the invention illustrated in Fig. 3 of the drawing, each pipe section is provided with a metallic sleeve 9 in lieu of the rubber sleeve 3, said metallic sleeve 9 having formed therein a plurality of circumferentially spaced, longitudinally extending folds or internal ribs 10 which permit water expansion should the water or other liquid in the pipe freeze. Otherwise, the pipe shown in Fig. 3 is substantially the same as that illustrated in Figs. 1 and 2 of the drawing.

It is believed that the many advantages of a pipe constructed in accordance with the present invention will be readily understood, and although the preferred embodiments of the invention are as illustrated and described, it is to be understood that further changes in the details of construction, and in the combination and arrangement of parts may be resorted to which will fall within the scope of the invention as claimed.

Having thus described my invention, what I claim as new is:—

1. A pipe comprising a pair of sections, each section including a tube, a compressible lining in the tube and an expansible sleeve in the lining, a coupling connecting the sections together, a compressible ring in the coupling between the ends of the sections, an expansible lining in the ring, and a water-proof cement between the ring and the sections for sealing the ends of said sections.

2. A pipe comprising a pair of sections, each section including a metallic tube, a compressible lining of heat resisting material in the tube and an expansible sleeve of water-proof material in the lining, threads on the end portions of the sections, a coupling threadedly connecting the sections together, a compressible ring mounted in the coupling between the ends of the sections, an expansible sleeve of water-proof material in the ring, and a water-proof cement between the ring and the pipe sections for sealing the ends of said sections.

SOLOMON J. WELCH.